(12) United States Patent
Leidel et al.

(10) Patent No.: US 10,884,626 B2
(45) Date of Patent: *Jan. 5, 2021

(54) TRANSLATION LOOKASIDE BUFFER IN A SWITCH

(71) Applicant: Micron Technology, Inc., Boise, ID (US)

(72) Inventors: John D. Leidel, McKinney, TX (US); Richard C. Murphy, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/009,335

(22) Filed: Jun. 15, 2018

(65) Prior Publication Data

US 2018/0292997 A1 Oct. 11, 2018

Related U.S. Application Data

(63) Continuation of application No. 14/718,649, filed on May 21, 2015, now Pat. No. 10,007,435.

(51) Int. Cl.
*G06F 12/10* (2016.01)
*G06F 3/06* (2006.01)
*G06F 12/1027* (2016.01)
*G06F 12/1009* (2016.01)

(52) U.S. Cl.
CPC .......... *G06F 3/0608* (2013.01); *G06F 3/0659* (2013.01); *G06F 3/0665* (2013.01); *G06F 3/0685* (2013.01); *G06F 12/1009* (2013.01); *G06F 12/1027* (2013.01); *G06F 2212/1012* (2013.01); *G06F 2212/305* (2013.01); *G06F 2212/682* (2013.01)

(58) Field of Classification Search
CPC .......... G06F 12/1009; G06F 12/1027
USPC .......................................... 711/202
See application file for complete search history.

(56) References Cited

U.S. PATENT DOCUMENTS

| | | | |
|---|---|---|---|
| 6,412,057 | B1 | 6/2002 | Sasahara et al. |
| 6,681,311 | B2 | 1/2004 | Gaskins et al. |
| 8,108,650 | B2 | 1/2012 | Petolino |
| 8,386,749 | B2 | 2/2013 | Dannowski et al. |
| 8,429,135 | B1 | 4/2013 | Lang |
| 8,607,026 | B2 | 12/2013 | Stravers et al. |

(Continued)

FOREIGN PATENT DOCUMENTS

| | | |
|---|---|---|
| CN | 101346706 A | 1/2009 |
| CN | 102165409 A | 8/2011 |

(Continued)

OTHER PUBLICATIONS

Supplementary European Search Report from related European patent application No. 16797148.0, dated Dec. 3, 2018, 8 pp.

(Continued)

*Primary Examiner* — Than Nguyen
(74) *Attorney, Agent, or Firm* — Brooks, Cameron & Huebsch, PLLC

(57) ABSTRACT

Examples of the present disclosure provide apparatuses and methods related to a translation lookaside buffer in memory. An example method comprises receiving a command including a virtual address from a host translating the virtual address to a physical address on volatile memory of a memory device using a translation lookaside buffer (TLB).

13 Claims, 4 Drawing Sheets

(56) References Cited

U.S. PATENT DOCUMENTS

| | | | |
|---|---|---|---|
| 8,787,060 B2 | 7/2014 | Lee | |
| 8,832,360 B2 | 9/2014 | Klein | |
| 9,015,447 B2 | 4/2015 | Ahn | |
| 9,047,090 B2 | 6/2015 | Kottilingal et al. | |
| 9,524,248 B2 | 12/2016 | Klein | |
| 9,575,907 B2 | 2/2017 | Walker | |
| 10,007,435 B2 * | 6/2018 | Leidel | G06F 3/0665 |
| 2002/0069329 A1 | 6/2002 | James et al. | |
| 2004/0225840 A1 * | 11/2004 | O'Connor | G06F 9/3891 711/122 |
| 2007/0061548 A1 | 3/2007 | Jordan et al. | |
| 2008/0282055 A1 | 11/2008 | Yang | |
| 2009/0254728 A1 | 10/2009 | Kamensky et al. | |
| 2010/0005269 A1 | 1/2010 | Davies et al. | |
| 2014/0025923 A1 | 1/2014 | Klein | |
| 2014/0068225 A1 | 3/2014 | Plondke et al. | |
| 2014/0237158 A1 | 8/2014 | Evans | |
| 2014/0281311 A1 | 9/2014 | Walker et al. | |
| 2014/0281351 A1 | 9/2014 | Topp et al. | |
| 2015/0012717 A1 * | 1/2015 | Murphy | G06T 1/60 711/167 |
| 2015/0039850 A1 | 2/2015 | Bennett | |
| 2016/0062660 A1 | 3/2016 | Kunimatsu et al. | |
| 2017/0031835 A1 * | 2/2017 | Serebrin | G06F 3/0611 |

FOREIGN PATENT DOCUMENTS

| | | |
|---|---|---|
| CN | 102473140 A | 5/2012 |
| CN | 102792286 A | 11/2012 |
| CN | 103999159 A | 8/2014 |
| CN | 104487953 A | 4/2015 |
| CN | 104520823 A | 4/2015 |
| KR | 10-2015-0036165 A | 4/2015 |
| TW | I230862 B | 4/2005 |
| TW | 201106157 A | 2/2011 |
| WO | 2013028859 A1 | 2/2013 |
| WO | 2014014711 A1 | 1/2014 |

OTHER PUBLICATIONS

Office Action from related Taiwanese patent application No. 105115860, dated Mar. 14, 2017, 16 pp.

Office Action from related Taiwanese patent application No. 105115860, dated Sep. 30, 2017, 23 pp.

International Search Report and Written Opinion from related international application No. PCT/US2016/032883, dated Aug. 24, 2016, 14 pp.

Notice of Preliminary Rejection from related Korean patent application No. 10-2017-7034841, dated May 16, 2019, 5 pp.

Office Action from related Chinese Patent Application No. 201680029486.9, dated Jun. 30, 2020, 23 pages.

\* cited by examiner

TRANSLATION LOOKASIDE BUFFER IN A SWITCH

PRIORITY INFORMATION

This application is a Continuation of U.S. application Ser. No. 14/718,649, filed May 21, 2015, which issues as U.S. Pat. No. 10,007,435 on Jun. 26, 2018, the contents of which are included herein by reference.

TECHNICAL FIELD

The present disclosure relates generally to semiconductor memory apparatuses and methods, and more particularly, to apparatuses and methods related to a translation lookaside buffer in memory.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Electronic systems often include a number of processing resources (e.g., one or more processors), which may retrieve and execute instructions and store the results of the executed instructions to a suitable location. A processor can comprise a number of functional units (e.g., herein referred to as functional unit circuitry such as arithmetic logic unit (ALU) circuitry, floating point unit (FPU) circuitry, and/or a combinatorial logic block, for example, which can execute instructions to perform logical operations such as AND, OR, NOT, NAND, NOR, and XOR logical operations on data (e.g., one or more operands).

A number of components in an electronic system may be involved in providing instructions to the functional unit circuitry for execution. The instructions may be generated, for instance, by a processing resource such as a controller and/or host processor. Data (e.g., the operands on which the instructions will be executed to perform the logical operations) may be stored in a memory array that is accessible by the functional unit circuitry. The instructions and/or data may be retrieved from the memory array and sequenced and/or buffered before the functional unit circuitry begins to execute instructions on the data. Furthermore, as different types of operations may be executed in one or multiple clock cycles through the functional unit circuitry, intermediate results of the operations and/or data may also be sequenced and/or buffered.

In many instances, the processing resources (e.g., processor and/or associated functional unit circuitry) may be external to the memory array, and data can be accessed (e.g., via a bus between the processing resources and the memory array to execute instructions). Data can be moved from the memory array to registers external to the memory array via a bus.

DETAILED DESCRIPTION

Figure 1:
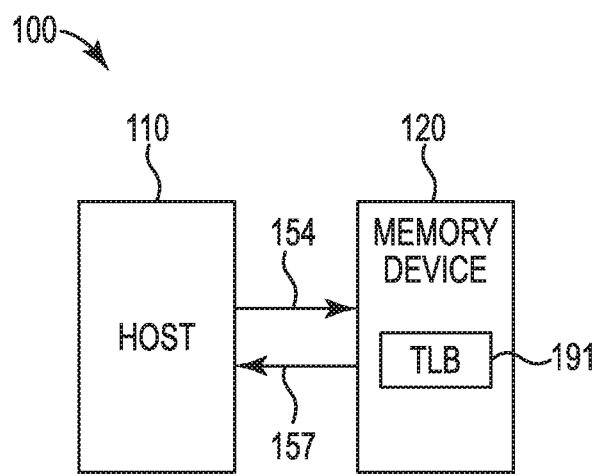
FIG. 1 is a block diagram of an apparatus in the form of a computing system including a host and a memory device in accordance with a number of embodiments of the present disclosure.

Examples of the present disclosure provide apparatuses and methods related to a translation lookaside buffer in memory. An example method comprises receiving a command including a virtual address from a host translating the virtual address to a physical address on volatile memory of a memory device using a translation lookaside buffer (TLB)

Computing architectures can include an addressing system where commands that include virtual addresses are used to locate data in a computing system. The addressing system can use virtual addresses to allow the memory devices of the computing system to store data at various physical locations without input and/or control from a host or a host processor. Therefore, the virtual addresses used in commands can be translated physical addresses during execution so the data associated with the commands can be located and retrieved.

In a number of embodiments, commands that include virtual addresses can be created and sent to a number of memory devices for execution. The commands that include virtual addresses can be created by a host and can be sent via a bus to a number of memory devices. Once the number of memory devices have received the commands over the bus, the number of memory devices can use a translation lookaside buffer (TLB) to translate the virtual addresses of the commands to physical addresses on the number of memory. The translation lookaside buffer can be located on a controller of the number of memory devices and/or located in memory arrays of the number of memory devices. Also, the TLB can be located in a logic base of a hybrid memory cube (HMC) and the logic base of the HMC can use the TLB and vault logic to translate virtual addresses to physical addresses. Once the number of memory devices have translated the virtual address to physical addresses, the number of memory devices can continue execution of the commands by locating data associated with the commands at the translated physical addresses.

In a number of embodiments, a computing system that includes a number of memory devices can execute multiple commands with virtual addresses due each memory device using a TLB that is on the respective memory device to perform the virtual address to physical address translation when executing the commands.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, "a number of" a particular thing can refer to one or more of such things (e.g., a number of memory arrays can refer to one or more memory arrays).

The figures herein follow a numbering convention in which the first digit or digits correspond to the drawing figure number and the remaining digits identify an element or component in the drawing. Similar elements or components between different figures may be identified by the use of similar digits. For example, 120 may reference element "20" in FIG. 1, and a similar element may be referenced as 320 in FIG. 3. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense FIG. 1 is a block diagram of an apparatus in the form of a computing system 100 including host 110 and a memory device 120 in accordance with a number of embodiments of the present disclosure. As used herein, a host 110, a memory device 120, a memory array, controller, and/or sensing circuitry might also be separately considered an "apparatus."

Computing system 100 includes a host 110 coupled to memory device 120 via buses 154 and 157. Host 110 can be a host system such as a personal laptop computer, a desktop computer, a digital camera, a mobile telephone, or a memory card reader, among various other types of hosts. Host 110 can include a system motherboard and/or backplane and can include a number of processing resources (e.g., one or more processors, microprocessors, or some other type of controlling circuitry). The system 100 can include separate integrated circuits for both the host 110 and the memory device 120 and/or host 110 and memory device 120 can be on the same integrated circuit. The system 100 can include digital signal processors (DSPs) and/or mobile processors.

The host 110 can include a processor. The processor can create commands for execution by the memory device 120. The commands created by the processor of host 110 can include virtual addresses. The commands can be sent to the memory device via bus 154. Once memory device 120 receives the commands from the host, the memory device can translate the virtual addresses of the commands to physical addresses on memory device 120.

Memory device 120 can be a DRAM device, a hybrid memory cube (HMC) device, SRAM device, STT RAM device, PCRAM device, TRAM device, processor in memory (PIM) device, RRAM device, NAND flash device, and/or NOR flash device, for instance. In a number of embodiments, memory device 120 can include a translation lookaside buffer (TLB) 191. TLB 191 can be used by the memory device to translate virtual addresses from commands to physical addresses. TLB 191 can be located in a controller of memory device 120 and/or in a memory array of memory device 120. In a number of embodiments, the computing system 100 can include a number of memory devices, wherein the number of memory devices can be a variety of different types of memory devices that each include a TLB to perform virtual to physical address translation.

In a number of embodiments, memory device 120 can receive a command including a virtual address from host 110. Memory device 120 identifies a physical address that is mapped to the virtual address and the physical address is used to access memory device 120. If memory device 120 is unable to identify which physical address is mapped to the virtual address from the command, then memory device 120 generates an error message, which may be transmitted to the host 100.

To identify the physical address that is mapped to the virtual address, memory device 120 uses translation lookaside buffer (TLB) 191. TLB 191 can store a table that maps virtual addresses to physical addresses. TLB 191 can include table entries for all of the virtual memory addresses received in commands from host 110. In a number of embodiments, TLB 191 can include table entries for virtual memory addresses that are accessed more frequently than virtual memory addresses stored in a translation device (not shown) on host 110. In a number of embodiments, TLB 191 can store data relating to how frequently a particular virtual address and/or physical address are accessed.

Figure 2:
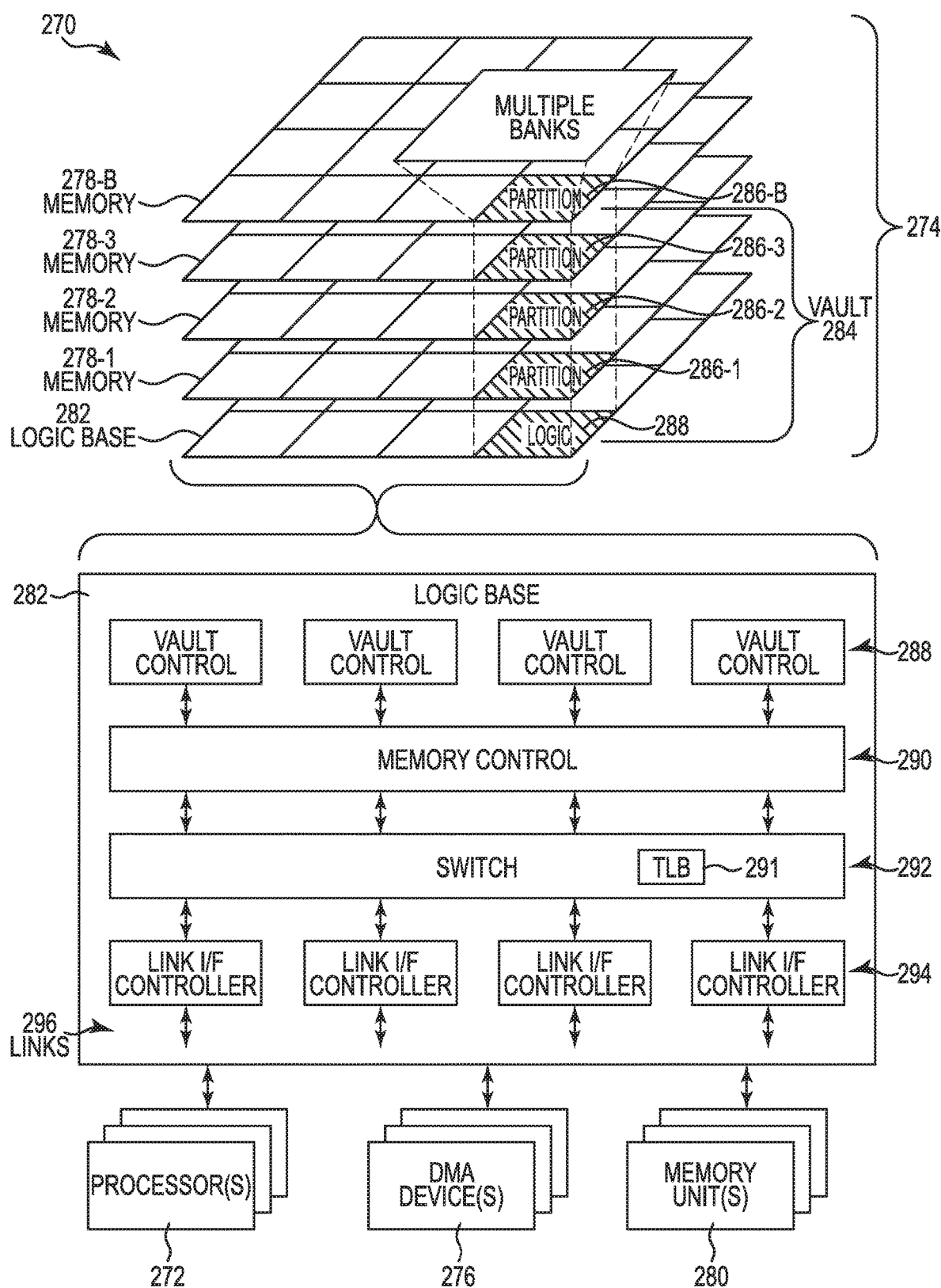
FIG. 2 illustrates a block diagram of an apparatus in the form of a computing device including a memory device and a number of requesting devices in accordance with a number of embodiments of the present disclosure.

FIG. 2 illustrates a block diagram of an apparatus in the form of a computing device 270 including a memory device 274 and a number of requesting devices 272, 276, 280 in accordance with a number of embodiments of the present disclosure. Examples of requesting devices can include a processor 272, a direct memory access (DMA) device 276, and/or a memory unit 280, among others. The processor(s) 272 can be analogous to the processors described in association with host 110 illustrated in FIG. 1. The memory unit 280 can be analogous to memory device 120 illustrated in FIG. 1 and/or to another memory unit other than memory device 120. The computing device 270 can be analogous to the computing device 100 illustrated in FIG. 1. In FIG. 2, more detail is shown regarding a specific example of a memory 274 that is a hybrid memory cube (HMC). The HMC 274 illustrated in FIG. 2 can be analogous to the memory device 120 illustrated in FIG. 1.

According to various embodiments of the present disclosure, a memory mapping module, including filter(s) and plurality of mapping mechanisms, can be implemented in various manners between the processor(s) 272 and the HMC 274, such as in control circuitry described below.

An HMC 274 can be a single package including multiple memory devices 278-1, 278-2, 278-3, . . . , 278-B, e.g., DRAM dies, and hardware logic device 282, e.g., a logic die, application-specific integrated circuit (ASIC), corresponding logic in another device, etc., stacked together using through silicon vias (TSV), although other embodiments may differ, e.g., the hardware logic device 282 may not necessarily be stacked with the memory devices 278. The memory within the HMC 274 can be organized into subsets, e.g., vaults, 284, where each vault 284 is functionally and operationally independent of other vaults 284. Each vault 284 can include a partition of memory from each of the memory devices 278. Each vault 284 can include a hardware logic unit 288, e.g., vault controller, in the logic device 282 that functions analogously to a memory controller for the vault 284. Each vault controller 284 can be coupled to a respective subset of the plurality of memory devices 278. For example, the vault controller 288 can manage memory operations for the vault 284 including determining its own timing requirements, e.g., instead of being managed by a requesting device such as a processor. The vault controller 288 can include a number of buffers for requests and responses with a processor 272 and can utilize the number of buffers to send responses to the processor 272 out of order with respect to an order in which the requests were received from the processor 272. Thus, the processor 272 can be configured to send a request via an interface to the HMC 274 without being aware of a read time associated with the request.

FIG. 2 includes an illustration of a more detailed view of a logic device 282 coupled between the memory devices 278 and the requesting devices 272, 276, 280. The logic base 282 can include memory control logic 288 for each vault, e.g., vault control. The vault controller 288 can be coupled to a shared memory control logic 290 for the HMC 274 that can consolidate functions of the vaults 284. However, the shared memory control logic 290 does not necessarily comprise a central memory controller in the traditional sense because each of the vaults 284 can be directly controlled, e.g., controlled timing, access, etc., independently of each other and because the shared memory control logic 290 does not necessarily interface, e.g., directly interface, with the requesting devices 272, 276, 280. Thus, in some embodiments, the computing device 270 and/or the memory 274 does not include a central memory controller. The memory control logic 290 can be coupled to a switch 292, e.g., a crossbar switch. The switch 292 can provide availability of the collective internal bandwidth from the vaults 284 to the input/output (I/O) links 296. The switch 292 can be coupled to link interface controllers 294, which control I/O links 296 to a requesting device 272, 276, 280. For example, the I/O links 296 can be serial fully duplexed input/output links. The logic device 282 can provide a logical/physical interface for the memory 274. The switch 292 can include translation lookaside buffer (TLB) 291. TLB 291 can be used by memory control 290 and vault control 288 of the logic base 282 to translate virtual address of commands received from requesting devices 272, 276, and/or 280 to physical addresses in the memory 274.

The memory 274 can receive requests from requesting devices such as a processor 272, a DMA device 276, and/or a memory unit 280, among others. As described herein, in some embodiments, the logic base 282 can be configured to use TLB 291 to translate virtual addresses from commands to physical addresses. Memory control 290 and/or vault control 288 can use the translated physical addresses to locate data associated with commands received by memory 274.

Figure 3:
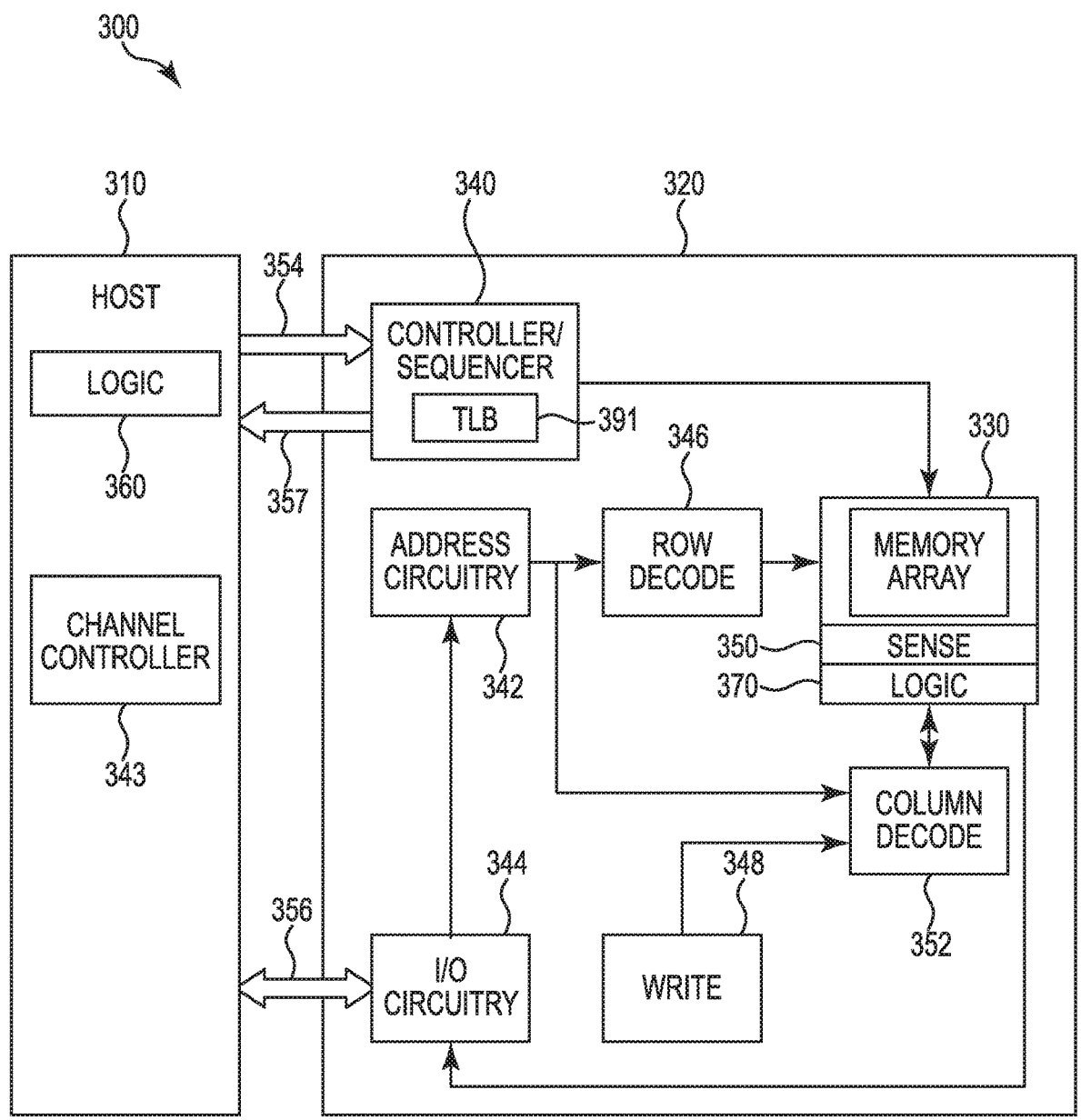
FIG. 3 is a block diagram of an apparatus in the form of a computing system including a memory device in accordance with a number of embodiments of the present disclosure.

FIG. 3 is a block diagram of an apparatus in the form of a computing system 300 including a memory device 320 in accordance with a number of embodiments of the present disclosure. As used herein, a memory device 320, memory controller 340, channel controller 343, bank arbiter 345, memory array 330, sensing circuitry 350, and logic circuitry 370 might also be separately considered an "apparatus."

System 300 includes a host 310 coupled (e.g., connected) to memory device 320, which includes a memory array 330. In a number of embodiments, memory device 320 can be a processor in memory (PIM) device. Host 310 can be a host system such as a personal laptop computer, a desktop computer, a digital camera, a smart phone, or a memory card reader, among various other types of hosts. Host 310 can include a system motherboard and/or backplane and can include a number of processing resources (e.g., one or more processors, microprocessors, or some other type of controlling circuitry). The system 300 can include separate integrated circuits or both the host 310 and the memory device 320 can be on the same integrated circuit. The system 300 can be, for instance, a server system and/or a high performance computing (HPC) system and/or a portion thereof. Although the example shown in FIG. 3 illustrates a system having a Von Neumann architecture, embodiments of the present disclosure can be implemented in non-Von Neumann architectures, which may not include one or more components (e.g., CPU, ALU, etc.) often associated with a Von Neumann architecture.

For clarity, the system 300 has been simplified to focus on features with particular relevance to the present disclosure. The memory array 330 can be a DRAM array, SRAM array, STT RAM array, PCRAM array, TRAM array, RRAM array, NAND flash array, and/or NOR flash array, for instance. The array 330 can comprise memory cells arranged in rows coupled by access lines (which may be referred to herein as word lines or select lines) and columns coupled by sense lines, which may be referred to herein as data lines or digit lines. Although a single array 330 is shown in FIG. 3, embodiments are not so limited. For instance, memory device 320 may include a number of arrays 330 (e.g., a number of banks of DRAM cells, NAND flash cells, etc.).

The memory device 320 includes address circuitry 342 to latch address signals provided over a data bus 356 (e.g., an I/O bus) through I/O circuitry 344. Status and/or exception information can be provided from the memory controller 340 on the memory device 320 to a channel controller 343, through a high speed interface (HSI) including an out-of-band bus 357, which in turn can be provided from the channel controller 343 to the host 310. Address signals are received through address circuitry 342 and decoded by a row decoder 346 and a column decoder 352 to access the memory array 330. Data can be read from memory array 330 by sensing voltage and/or current changes on the data lines using sensing circuitry 350. The sensing circuitry 350 can read and latch a page (e.g., row) of data from the memory array 330. The I/O circuitry 344 can be used for bi-directional data communication with host 310 over the data bus 356. The write circuitry 348 is used to write data to the memory array 330.

Memory controller 340, e.g., bank control logic and/or sequencer, decodes signals provided by control bus 354 from the host 310. These signals can include chip enable signals, write enable signals, and address latch signals that are used to control operations performed on the memory array 330, including data read, data write, and data erase operations. In various embodiments, the memory controller 340 is responsible for executing instructions from the host 310 and sequencing access to the array 330. The memory controller 340 can be a state machine, a sequencer, or some other type of controller. The controller 340 can control shifting data (e.g., right or left) in an array, e.g., memory array 330. The controller 340 can include translation lookaside buffer (TLB) 391. TLB 391 can be used by memory controller 340 to translate virtual address of commands received from host 310 to physical addresses in the memory array 330.

The controller 340 can receive commands from host 310 via bus 354. The controller 340 can be configured to use TLB 391 to translate virtual addresses from commands to physical addresses. Controller 340 can use the translated physical addresses to locate data associated with commands received by memory device 320.

In a number of embodiments, the sensing circuitry 350 can comprise a number of sense amplifiers and a number of compute components, which may serve as, and be referred to herein as, an accumulator and can be used to perform logical operations (e.g., on data associated with complementary data lines).

In a number of embodiments, the sensing circuitry 350 can be used to perform logical operations using data stored in array 330 as inputs and store the results of the logical operations back to the array 330 without transferring data via a sense line address access (e.g., without firing a column decode signal). As such, various compute functions can be performed using, and within, sensing circuitry 350 rather than (or in association with) being performed by processing resources external to the sensing circuitry (e.g., by a processor associated with host 310 and/or other processing circuitry, such as ALU circuitry, located on device 320 (e.g., on controller 340 or elsewhere)).

In various previous approaches, data associated with an operand, for instance, would be read from memory via sensing circuitry and provided to external ALU circuitry via I/O lines (e.g., via local I/O lines and/or global I/O lines). The external ALU circuitry could include a number of registers and would perform compute functions using the operands, and the result would be transferred back to the array via the I/O lines. In contrast, in a number of embodiments of the present disclosure, sensing circuitry 350 is configured to perform logical operations on data stored in memory array 330 and store the result back to the memory array 330 without enabling an I/O line (e.g., a local I/O line) coupled to the sensing circuitry 350. The sensing circuitry 350 can be formed on pitch with the memory cells of the array. Additional logic circuitry 370 can be coupled to the sensing circuitry 350 and can be used to store, e.g., cache and/or buffer, results of operations described herein.

As such, in a number of embodiments, circuitry external to array 330 and sensing circuitry 350 is not needed to perform compute functions as the sensing circuitry 350 can perform the appropriate logical operations to perform such compute functions without the use of an external processing resource. Therefore, the sensing circuitry 350 may be used to compliment and/or to replace, at least to some extent, such an external processing resource (or at least the bandwidth consumption of such an external processing resource).

However, in a number of embodiments, the sensing circuitry 350 may be used to perform logical operations (e.g., to execute instructions) in addition to logical operations performed by an external processing resource (e.g., host 310). For instance, host 310 and/or sensing circuitry 350 may be limited to performing only certain logical operations and/or a certain number of logical operations.

Enabling an I/O line can include enabling (e.g., turning on) a transistor having a gate coupled to a decode signal (e.g., a column decode signal) and a source/drain coupled to the I/O line. However, embodiments are not limited to not enabling an I/O line. For instance, in a number of embodiments, the sensing circuitry (e.g., 350) can be used to perform logical operations without enabling column decode lines of the array; however, the local I/O line(s) may be enabled in order to transfer a result to a suitable location other than back to the array 330 (e.g., to an external register).

Figure 4:
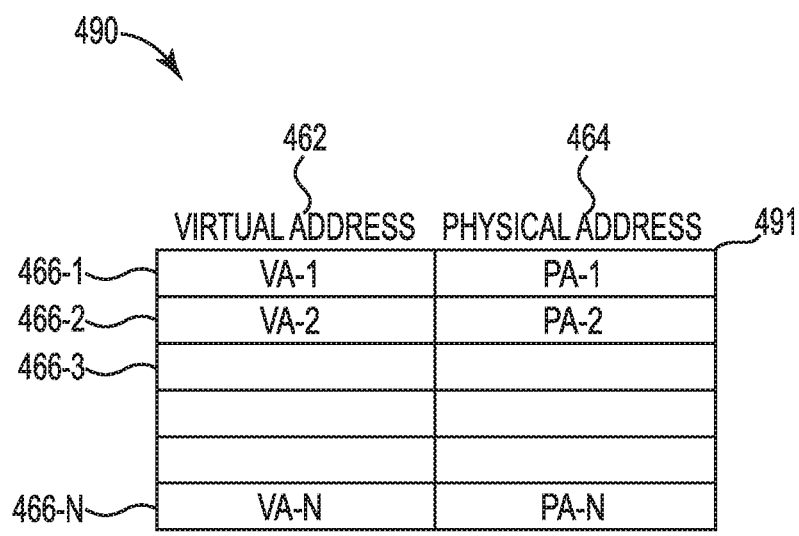
FIG. 4 illustrates a table showing a translation lookaside buffer in accordance with a number of embodiments of the present disclosure.

FIG. 4 illustrates a table 490 showing a translation lookaside buffer 491 in accordance with a number of embodiments of the present disclosure. In a number of embodiments, the TLB 491 may be a content-addressable memory (CAM) device or n-way associative memory device. TLB 491 can store a table having rows and columns, where each row 466-1, 466-2, 466-3, . . . , 466-N can correspond to a separate table entry. As such, each row 466-1, 466-2, 466-3, . . . , 466-N includes a virtual address 462 and a physical address 464.

Rows 466-1, 466-2, 466-3, . . . , 466-N includes a listing of all virtual memory addresses contained in TLB 491. Further, physical addresses 464 include a physical address in each row 466-1, 466-2, 466-3, . . . , 466-N that corresponds to the virtual addresses 462 of the respective row 466-1, 466-2, 466-3, . . . , 466-N. Virtual addresses 462 can be mapped to physical addresses 466 in table 490 when a memory device is executing a command that include virtual addresses that can be translated to physical address on a memory device.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a number of memory devices including a number of vaults, each of the number of vaults including a partition of memory from each of the number of memory devices; and
   a logic base on which the number of memory devices are stacked, the logic base including:
   a switch configured to provide availability of collective bandwidth from the number of vaults; and
   a translation lookaside buffer (TLB) located on the switch;
   the logic base is configured to perform, in response to receipt of a command including a virtual address, a virtual address to physical address translation to translate the virtual address to a physical address in one of the number of memory vaults using the TLB, wherein a physical address corresponding to the virtual address is searched only in the TLB.

2. The apparatus of claim 1, wherein each of the number of vaults is functionally and operationally independent of other vaults.

3. The apparatus of claim 1, wherein each of the number of vaults is coupled to a corresponding one of a number of vault controllers, and wherein the number of vault controllers are configured to manage memory operations for a respective one of the number of vaults.

4. The apparatus of claim 1, wherein the logic base is configured to use the TLB to translate no more than a number of bits to identify the physical address on the one of the number of memory vaults.

5. The apparatus of claim 1, wherein the logic base is configured to use the TLB to map the virtual address of the command directly to the physical address on the memory device.

6. The apparatus of claim 1, wherein the command is received from a requesting device.

7. The apparatus of claim 1, wherein the logic base is configured to remap, to update the TLB, a relationship between virtual and physical addresses in response to data in the number of memory devices being moved.

8. An apparatus, comprising:
 a number of memory devices including a number of vaults; and
 a logic base on which the number of memory devices are stacked, the logic base including:
  a switch configured to provide availability of collective bandwidth from the number of vaults;
  a translation lookaside buffer (TLB) located on the switch; and
  a number of vault controllers, each of the number of vault controllers coupled to a corresponding one of the number of vaults, and wherein each of the number of vault controllers is configured to perform, in response to receipt of a command including a number of virtual addresses, a virtual address to physical address translation to translate the number of virtual addresses of a command to a number of physical addresses in the number of memory devices using the TLB, wherein a physical address corresponding to at least one of the number of virtual addresses is searched only in the TLB.

9. The apparatus of claim 8, wherein the number of vaults controllers are coupled to a memory control unit, and wherein the memory control unit is configured to consolidate functions of the number of vaults of the number of memory devices.

10. The apparatus of claim 8, wherein the command is received from a requesting device, and wherein the switch is coupled to a link interface controller that controls an input/output (I/O) link to the requesting device.

11. The apparatus of claim 8, wherein each of the number of vaults includes a partition of memory from each of the number of memory devices.

12. The apparatus of claim 8, wherein the number of physical addresses of the number of memory devices includes each addressable physical address of the number of memory devices.

13. The apparatus of claim 8, wherein the command is received from a host.

* * * * *